J. H. HILL.
Wheel Cultivator.
No. 79,119.
Patented June 23, 1868.
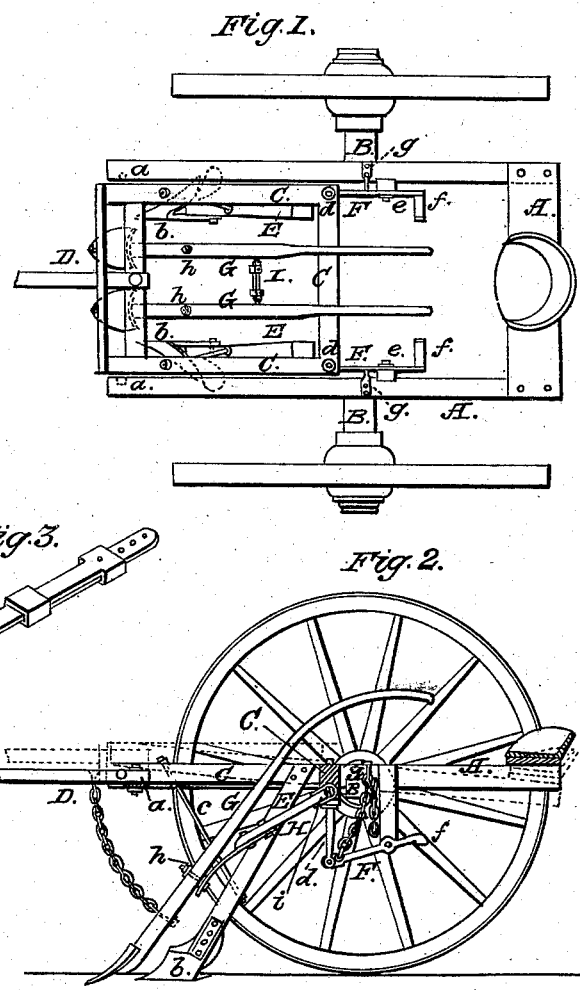

United States Patent Office.

JUSTIN H. HILL, OF CLINTON, ILLINOIS.

Letters Patent No. 79,119, dated June 23, 1868.

IMPROVEMENT IN CULTIVATORS.

*The Schedule referred to in these Letters Patent and making part of the same.*

TO ALL WHOM IT MAY CONCERN:

Be it known that I, JUSTIN H. HILL, of Clinton, in the county of De Witt, and in the State of Illinois, have invented new and useful Improvements in Cultivators; and I do hereby declare that the following is a full, clear, and exact description thereof, reference being had to the annexed drawings, making part of this specification, in which—

Figure 1 is a plan or top view,

Figure 2 is a vertical longitudinal section of the same, and

Figure 3 a representation of a part in detail.

A A is the frame of the implement, having wood or iron axles, B B, for the wheels, securely attached to the outside, as shown, or having a continuous axle-tree extending across the frame, and forming part of the same.

The rear cross-tie of the frame A forms the support for the seat of the driver.

An inner frame, C, is attached by joint pins $a$ to the front end of the frame A, so that it may vibrate on these pins, and to this frame C is attached the tongue or draught-beam D. E E are the standards of the plows $b\ b$, and they are rigidly secured to the rear end of the sides of the frame C, and are braced by the rods $c\ c$.

Projecting downward from each of the rear corners of the frame C is a stout bar $d\ d$, connected at its lower end with a lever, F, having its fulcrum at $e$, and terminating at the other end in a stirrup, $f$, within the reach of the driver's foot. When he presses on the stirrup, the front end of the frame A will be lifted, carrying the frame C up with it, as shown in fig. 2, by dotted lines, raising the plows clear of the ground.

The frame C is kept from falling down by a chain on each side, which keeps it suspended at any required height from the hooks $g$, on the frame A, and thus regulates the depth of furrow.

G G are the shovel-handles; they are each connected by a loose bolt, $h$, on which they swing laterally, to an arm, H, so connected by a strap-joint at $i$ to the under side of the rear cross-tie of the frame C that the said arm may have a free vertical vibration, and move the shovel with it. A pressure on the end of the shovel-handle will elevate the point of the shovel, the fulcrum of the lever formed by the handle and the arm being at $i$.

The shovels are held to their positions for a proper depth of work by the chains, which connect them with the front rail of the frame C, and which may be taken up or let out at pleasure. They are also connected by a sliding adjustable connecting-link or bar, I, shown separately in fig. 3, so that their points may be brought together or separated more or less, as required, when a pin passed through the holes shown in fig. 3, will hold them until a change is desired.

The connecting-link I is secured at each end to the shovel-handles by staples, so that one shovel, or both, may be moved in a vertical plane, while perfect freedom of motion is allowed them together in all other directions.

What I claim as new, and desire to secure by Letters Patent, is—

1. The frames A and C, and the lever F, combined and operating substantially as set forth.

2. The shovel-handles G, arms H, and connecting-bar I, arranged substantially as described, in combination with the frame C, and its adjuncts, substantially as and for the purpose set forth.

In testimony that I claim the above-described improvements in cultivators, I have hereunto signed my name, this 21st day of November, 1867.

JUSTIN H. HILL.

Witnesses:
SOLOMON F. LEWIS,
CHARLES H. DENNETT.